US012133185B2

(12) United States Patent
Liu et al.

(10) Patent No.: US 12,133,185 B2
(45) Date of Patent: Oct. 29, 2024

(54) SYNCHRONIZATION METHOD AND DEVICE

(71) Applicant: HUAWEI TECHNOLOGIES CO., LTD., Shenzhen (CN)

(72) Inventors: Yongzhi Liu, Dongguan (CN); Tao Lin, Shenzhen (CN); Jianqiang Liu, Dongguan (CN); Chun Yuan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 17/725,962

(22) Filed: Apr. 21, 2022

(65) Prior Publication Data

US 2022/0248353 A1 Aug. 4, 2022

Related U.S. Application Data

(63) Continuation of application No. PCT/CN2019/112487, filed on Oct. 22, 2019.

(51) Int. Cl.
*H04W 56/00* (2009.01)
*H04J 3/06* (2006.01)
*H04W 80/02* (2009.01)

(52) U.S. Cl.
CPC ......... *H04W 56/001* (2013.01); *H04J 3/0667* (2013.01); *H04W 80/02* (2013.01)

(58) Field of Classification Search
CPC ............... H04W 56/001; H04W 80/02; H04W 56/0015; H04J 3/0667; H04J 3/0697
See application file for complete search history.

(56) References Cited

U.S. PATENT DOCUMENTS

| 2015/0139251 | A1  | 5/2015 | Tzeng |
|---|---|---|---|
| 2017/0006567 | A1  | 1/2017 | Hu et al. |
| 2019/0059071 | A1* | 2/2019 | Khoryaev ............. H04W 4/021 |
| 2021/0297230 | A1* | 9/2021 | Dror ..................... H04L 7/0016 |

FOREIGN PATENT DOCUMENTS

| CN | 101814984 A | 8/2010 |
|---|---|---|
| CN | 102783078 A | 11/2012 |
| CN | 104113517 A | 10/2014 |
| CN | 108322280 B | 7/2019 |
| CN | 110224775 A | 9/2019 |
| KR | 20090039071 A | 4/2009 |

* cited by examiner

*Primary Examiner* — Kyaw Z Soe
(74) *Attorney, Agent, or Firm* — Rimon PC

(57) ABSTRACT

Embodiments of this application disclose a synchronization method and a device. A device marks, based on a preset period, a periodic code block in a data bitstream to be sent from a MAC layer to a PHY layer. The device sends the data bitstream to a peer device through the PHY layer, records a sending time of each periodic code block as a first timestamp during sending, and returns the first timestamp to the MAC layer. By marking a timestamp for the periodic code block received from the MAC layer, the device sets a PHY-layer-based time reference scale (namely, the first timestamp) at the PHY layer.

20 Claims, 8 Drawing Sheets

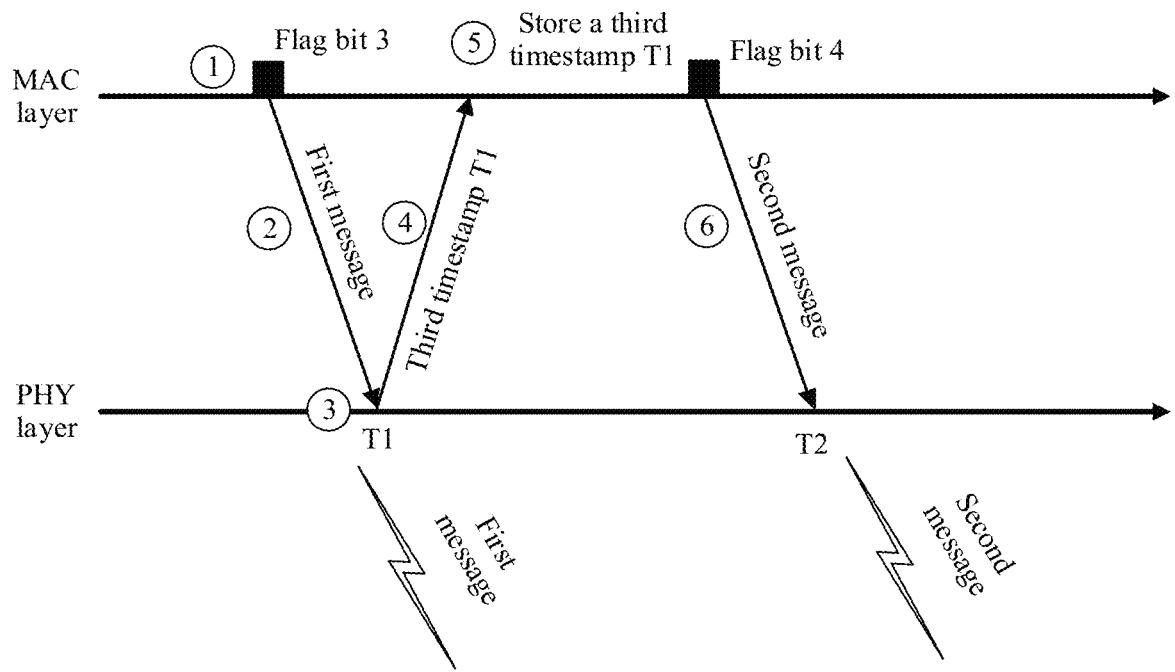

FIG. 6

| A PHY layer marks, based on a preset period, a periodic code block in a data bitstream to be sent from the PHY layer to a MAC layer, and records, as a fourth timestamp, a sending time at which the periodic code block is sent from the PHY layer | 701 |

↓

| The PHY layer sends the fourth timestamp to the MAC layer | 702 |

↓

| The MAC layer determines, based on the fourth timestamp, a receiving time at which the PHY layer obtains a synchronization message | 703 |

FIG. 7

SYNCHRONIZATION METHOD AND DEVICE

CROSS-REFERENCE TO RELATED APPLICATIONS

This application is a continuation of International Application No. PCT/CN2019/112487, filed on Oct. 22, 2019, the disclosure of which is hereby incorporated by reference in its entirety.

TECHNICAL FIELD

This application generally relates to the field of precise clock synchronization technologies, and in particular, to a synchronization method and a device.

BACKGROUND

The Institute of Electrical and Electronic Engineers (IEEE) defines IEEE 1588 protocol for "precise clock synchronization protocol for networked measurement and control systems". The IEEE 1588 protocol is a general specification for improving a timing synchronization capability of a network system, and a basic concept of the protocol is to synchronize an internal clock (which may also be referred to as a slave clock) of a network device (which may also be referred to as a slave device) and a master clock of a main control device, by using hardware and software, so that a distributed communication network can have strict timing synchronization. A precision time protocol (PTP) is defined, and is used to perform sub-microsecond-level synchronization for clocks in a sensor, an executor, and a terminal device with a standard Ethernet or another distributed bus system that uses a multicast technology. A set of message-based synchronization protocols is specified in technical specifications in the IEEE 1588 protocol. A data packet (which may also be referred to as a message) with a timestamp is periodically released, so that a clock of a node in each network can be corrected. In this way, synchronous running of an entire system is implemented.

It is required in the IEEE 1588 protocol that a time point of the timestamp is a time point at which a device receives or sends a data packet on a transmission medium, and a current implementation is as follows: The timestamp is inserted and/or detected at a medium access control (MAC) layer of the device, but the inserted and/or detected timestamp does not cover a delay of a part from the MAC layer of the device to a physical layer (PHY) of the device, and consequently, an error of precision of the timestamp is caused.

To eliminate the foregoing error, a commonly used solution is to compensate for the delay of the part from the MAC layer to the PHY layer. A used compensation manner is to insert a fixed compensation value into the MAC layer when the timestamp is marked at the MAC layer, where the fixed compensation value indicates the delay from the MAC layer of the device to the PHY layer. However, because network load of the device changes at any moment, a delay of a message of the device from the MAC layer to the PHY layer is not the same throughout the moments based on different network load (for example, when the network load is large, the delay is longer, and various sharp jitters occur at the PHY layer). Therefore, the foregoing manner of inserting the fixed compensation value cannot reflect a real-time delay variation at the PHY layer, and therefore, timestamp precision in IEEE 1588 is reduced.

SUMMARY

A first aspect of embodiments of this application provides a synchronization method and a device, to eliminate a delay generated at a physical layer (PHY) layer due to a reason such as a jitter when a synchronization message is sent, and improve precision of a sending timestamp of the synchronization message.

In view of this, the first aspect of this application provides a synchronization method, including:

A device (for example, a master device) marks a periodic code block (there may be one or more periodic code blocks, where the periodic code block may be data of one bit, or may be data of a plurality of bits, and this is not specifically limited herein) based on a predetermined period in a data stream to be sent from a medium access control (MAC) layer to a PHY layer, and the periodic code block is a set of code blocks with a fixed unit interval (UI). Then, the PHY layer of the device sends the data bitstream to a peer device (for example, a slave device), records a sending time of each periodic code block as a first timestamp during sending, further sends the recorded first timestamp to the MAC layer (for example, sends the first timestamp as an independent data bitstream), and calculates, at the MAC layer based on the returned first timestamp, a sending timestamp of a synchronization message (for example, a Sync message or a Follow_up message) to be sent to the peer device. The synchronization message carrying the sending timestamp is sent to the peer device.

In the foregoing implementations, by marking a timestamp for the periodic code block received from the MAC layer, the PHY layer of the device sets a PHY-layer-based time reference scale (namely, the first timestamp). In this case, if a synchronization message needs to be sent from the MAC layer of the device to the peer device, because the time reference scale is a timestamp marked at the PHY layer, the device calculates, in real time by using the time reference scale, a time point at which the synchronization message is actually sent from the PHY layer (that is, the timestamp is marked), so that the time point at which the synchronization message is actually sent from the PHY layer of the device can be obtained. In this way, a delay at the PHY layer is eliminated, and precision of a sending timestamp of the synchronization message (for example, a 1588 message) is improved.

With reference to the first aspect of embodiments of this application, in some implementations of the first aspect of this application, that the MAC layer determines, based on the first timestamp, the sending timestamp carried in the synchronization message may be implemented in the following manner. When the device needs to send the synchronization message to the peer device, the MAC layer first calculates a UI between a flag bit of the synchronization message and a target code block, where the target code block is a periodic code block obtained by the MAC layer and that is closest to the flag bit of the synchronization message, and the target code block is located before the flag bit of the synchronization message. After determining the UI between the synchronization message and the target code block, the MAC layer may determine, based on the UI, a delay (which may be denoted as T) caused to the PHY layer due to a reason such as a jitter. After determining the delay, the MAC layer further calculates the sending timestamp of the synchronization message based on the delay and a timestamp (which may be referred to as a second timestamp and may be denoted as Tan) that corresponds to the target code block. It should be noted herein that, because the first timestamp is a set of sending times at which all periodic code blocks are sent from the PHY layer, and the target code block is the code block that is closest to the flag bit of the synchronization message, the second timestamp is included in the first timestamp.

In the foregoing implementations, how the MAC layer of the device determines, based on the first timestamp, the sending timestamp carried in the synchronization message is described in an operable manner.

With reference to some implementations of the first aspect of this application, in a second implementation, a manner in which the device determines the delay T by using the MAC layer may be, but is not limited to, determining a physical link rate LinkRate (unit: bits per second (bps)) of the PHY layer. For example, a rate of a lane of a serializer/deserializer (serdes). The manner may then include determining that a ratio of the UI to the physical link rate LinkRate is the delay T. In other words, T=Delta/LinkRate, where Delta represents a UI distance by which the flag bit of the synchronization message is transferred at the PHY layer.

In the foregoing implementations, how the MAC layer of the device determines the delay T is described, or in other words, the ratio of the UI to the physical link rate is used as the delay. This is a simple method and is easy to operate and/or implement.

With reference to some embodiments of this application and the first implementation and the second implementation of the first aspect of this application, in a third implementation, the PHY layer may send the first timestamp to the MAC layer in a plurality of manners, including but not limited to the following manners: (1) returning the first timestamp to the MAC layer as an independent data bitstream, or in other words, each time the PHY layer records a sending time of a periodic code block, the PHY layer transmits the sending time to the MAC layer as a data bitstream; or (2) adding the first timestamp to the data bitstream to be transmitted from the PHY layer to the MAC layer, and sending the data bitstream, or in other words, each time the PHY layer records a sending time of a periodic code block (because a data bitstream between the PHY layer and the MAC layer exists at all moments), the PHY layer adds the recorded sending time of the periodic code block to the data bitstream to be sent from the PHY layer to the MAC layer and sends the data bitstream to the MAC layer.

In the foregoing implementations, at least two manners in which the PHY layer sends the first timestamp to the MAC layer are described, and either manner may be implemented interchangeably.

With reference to some embodiments of this application and the first implementation to the third implementation of the first aspect of this application, in a fourth implementation, the synchronization message may include a 1588 message, for example, which may be a Sync message, a Follow_up message, a Delay_Req message, or a Delay_Resp message specified in a 1588 protocol. The synchronization message is not limited herein.

In the foregoing implementations, any synchronization message that is sent by the device and that carries a sending timestamp may be referred to as the synchronization message in embodiments of this application. It is noted herein that the synchronization message may be a 1588 message.

In addition, a second aspect of embodiments of this application further provides a synchronization method, including:

A MAC layer of a device sends, to a PHY layer, a first message that needs to be sent to a peer device, and the PHY layer of the device sends the first message to the peer device. In this case, the PHY layer records, as a third timestamp, a sending time at which the first message is sent from the PHY layer. Then, the PHY layer sends the recorded third timestamp to the MAC layer. The device immediately sends a second message after sending the first message. When sending the second message, the MAC layer marks the third timestamp for the second message as a sending timestamp, and the third timestamp is used to indicate exact time at which the first message is sent from the PHY layer. After the MAC layer sends the second message marked with the third timestamp to the PHY layer, the PHY layer sends the second message carrying the third timestamp to the peer device.

In the foregoing implementations, the sending time of the first message is marked as the third timestamp at the PHY layer, and the third timestamp (that is, the sending timestamp) is carried in the subsequently sent second message. In this way, the second message carries the exact time at which the first message is sent from the PHY layer of the device, so that a delay at the PHY layer is eliminated, and further precision of a sending timestamp of a synchronization message (for example, a 1588 message) is improved.

With reference to some embodiments of this application, in a first implementation of the second aspect of embodiments of this application, the PHY layer may send the third timestamp to the MAC layer in a plurality of manners, including but not limited to the following manners: (1) returning the third timestamp to the MAC layer as an independent data bitstream; or (2) adding the third timestamp to a data bitstream to be transmitted from the PHY layer to the MAC layer, and sending the data bitstream, or in other words, after the PHY layer records the third timestamp, because a data bitstream between the PHY layer and the MAC layer exists at all moments, the PHY layer adds the third timestamp to the data bitstream to be sent from the PHY layer to the MAC layer, and sends the data bitstream to the MAC layer.

In the foregoing implementations, at least two manners in which the PHY layer sends the third timestamp to the MAC layer are described, and either manner may be implemented interchangeably.

With reference to some embodiments of this application and the first implementation of the second aspect of embodiments of this application, in a second implementation, the first message may be a Sync message specified in a 1588 protocol, and the second message may be a Follow_up message specified in the 1588 protocol.

In the foregoing implementations, that the first message and the second message may be a Sync message and a Follow_up message specified in the 1588 protocol is separately described, and are both applicable.

In addition, a third aspect of embodiments of this application provides a synchronization method, including:

A PHY layer of a device marks, based on a preset period, a periodic code block in a data bitstream to be sent from the PHY layer to a MAC layer, and records, as a fourth timestamp, a sending time at which the periodic code block is sent from the PHY layer, where the fourth timestamp is a set of sending times of all periodic code blocks that are recorded in the data bitstream. After recording the sending time (namely, the fourth timestamp) of the periodic code block in the data bitstream, the PHY layer sends the fourth timestamp to the MAC layer. The MAC layer obtains the fourth timestamp sent by the PHY layer. If the PHY layer obtains a synchronization message (such as a Sync message)

sent by a peer device in this case, the MAC layer determines, based on the fourth timestamp, a receiving time at which the synchronization message is obtained at the PHY layer, and the receiving time is used to indicate a time point at which the synchronization message is received by the PHY layer.

In the foregoing implementations, by marking a timestamp for the periodic code block to be sent to the MAC layer, the PHY layer of the device sets a PHY-layer-based time reference scale (namely, the fourth timestamp). In this case, if the PHY layer obtains the synchronization message sent by the peer device, the synchronization message needs to be sent from the PHY layer to the MAC layer for identification. Because the time reference scale is a timestamp marked at the PHY layer, the MAC layer calculates, in real time by using the time reference scale, a time point (namely, a receiving time) at which the PHY layer actually obtains the synchronization message, so that a time point at which the synchronization message is actually received by the PHY layer of the device can be obtained. In this way, a delay of the PHY layer is eliminated, and further precision of the receiving time of the synchronization message (for example, a 1588 message) is improved.

With reference to some embodiments of this application, in a first implementation of the third aspect of this application, that the MAC layer determines, based on the fourth timestamp, the receiving time at which the PHY layer obtains the synchronization message may be implemented in the following manner. When the PHY layer of the device obtains the synchronization message sent by the peer device, the synchronization message is sent to the MAC layer, and the MAC layer first calculates a UI distance between a flag bit of the synchronization message and a target code block, where the target code block is a periodic code block obtained by the MAC layer and that is closest to the flag bit of the synchronization message, and the target code block is located before the flag bit of the synchronization message. The manner may further include that after determining the UI between the synchronization message and the target code block, the MAC layer may determine, based on the UI, a delay T caused to the PHY layer due to a reason such as a jitter. The manner may further include, after determining the delay T, the MAC layer further calculates the sending timestamp of the synchronization message based on the delay T and a timestamp (which may be referred to as a fifth timestamp and may be denoted as Tbn) that is corresponding to the target code block. It should be noted herein that, because the fourth timestamp is a set of sending times at which all periodic code blocks are sent from the PHY layer, and the target code block is the code block that is closest to the flag bit of the synchronization message, the fifth timestamp is included in the fourth timestamp.

In the foregoing implementations, how the MAC layer of the device determines, based on the fourth timestamp, the receiving time at which the PHY layer obtains the synchronization message is described in an operable manner.

With reference to the third aspect of this application and the first implementation of the third aspect of embodiments of this application, in a second implementation, a manner in which the device determines the delay T by using the MAC layer may be but is not limited to, determining a physical link rate LinkRate (unit: bps) of the PHY layer, for example, a rate of a lane of a serdes, and further determining that a ratio of the UI to the physical link rate LinkRate is the delay T. In other words, T=Delta/LinkRate, where Delta represents a UI distance by which the flag bit of the synchronization message is transferred at the PHY layer.

In the foregoing implementations, how the MAC layer of the device determines the delay T is described, or in other words, the ratio of the UI to the physical link rate is used as the delay. This is a simple method and is easy to operate and/or implement.

With reference to some embodiments of this application and the first implementation and the second implementation of the third aspect of embodiments of this application, in a third implementation, the PHY layer may send the fourth timestamp to the MAC layer in a plurality of manners, including but not limited to the following manners: (1) returning the fourth timestamp to the MAC layer as an independent data bitstream, or in other words, each time the PHY layer records a sending time of a periodic code block, the PHY layer transmits the sending time to the MAC layer as a data bitstream; or (2) adding the fourth timestamp to a data bitstream to be transmitted from the PHY layer to the MAC layer (for example, the foregoing data bitstream), and sending the data bitstream, or in other words, each time the PHY layer records a sending time of a periodic code block (because a data bitstream between the PHY layer and the MAC layer exists at all moments), the PHY layer adds the recorded sending time of the periodic code block to the data bitstream to be sent from the PHY layer to the MAC layer, and sends the data bitstream to the MAC layer.

In the foregoing implementations, at least two manners in which the PHY layer sends the fourth timestamp to the MAC layer are described, and either manner may be implemented interchangeably.

With reference to some embodiments of this application and the first implementation to the third implementation of the third aspect of embodiments of this application, in a fourth implementation, the synchronization message may include a 1588 message, for example, may be a Sync message, a Follow up message, a Delay_Req message, or a Delay_Resp message specified in a 1588 protocol. The synchronization message is not limited herein.

In the foregoing implementations, any synchronization message that is sent by the device and that carries a sending timestamp may be referred to as the synchronization message in embodiments of this application. It is noted herein that the synchronization message may be a 1588 message.

A fourth aspect of embodiments of this application provides a device, and the device has a function of implementing the method in the first aspect or any possible implementation of the first aspect. The function may be implemented by using hardware or by executing corresponding software by using hardware. The hardware or software includes one or more modules or circuits corresponding to the function.

A fifth aspect of embodiments of this application provides a device, and the device has a function of implementing the method in the second aspect or any possible implementation of the second aspect. The function may be implemented by using hardware or by executing corresponding software by using hardware. The hardware or software includes one or more modules or circuits corresponding to the function.

A sixth aspect of embodiments of this application provides a device, and the device has a function of implementing the method in the third aspect or any possible implementation of the third aspect. The function may be implemented by using hardware or by executing corresponding software by using hardware. The hardware or software includes one or more modules or circuits corresponding to the function.

A seventh aspect of embodiments of this application provides a device. The device may include a processor, a memory, and an input/output interface, where the processor and the memory are connected to the input/output interface. The memory is configured to store program code. When invoking the program code in the memory, the processor performs the steps of the method provided in the first aspect of this application or any implementation of the first aspect.

An eighth aspect of embodiments of this application provides a device. The device may include a processor, a memory, and an input/output interface, where the processor and the memory are connected to the input/output interface. The memory is configured to store program code. When invoking the program code in the memory, the processor performs the steps of the method provided in the second aspect of this application or any implementation of the second aspect.

A ninth aspect of embodiments of this application provides a device. The device may include a processor, a memory, and an input/output interface, where the processor and the memory are connected to the input/output interface. The memory is configured to store program code. When invoking the program code in the memory, the processor performs the steps of the method provided in the third aspect of this application or any implementation of the third aspect.

The processor mentioned in any one of the foregoing aspects may be a general central processing unit (CPU), a microprocessor, an application-specific integrated circuit (ASIC), or one or more integrated circuits used to control program execution of the first aspect (or any implementation of the first aspect) to the third aspect (or any implementation of the third aspect).

A tenth aspect of embodiments of this application provides a storage medium. It should be noted that technical solutions of the present disclosure essentially, or as a part contributing to a conventional technology, or all or some of the technical solutions may be implemented in a form of a software product. The computer software product is stored in a storage medium and is configured to store computer software instructions used by the foregoing device, and includes a program designed to perform the first aspect (or any implementation of the first aspect) to the third aspect (or any implementation of the third aspect).

The storage medium includes various media that can store program code, such as a universal serial bus (USB) flash drive, a removable hard disk, a read-only memory (ROM), a random access memory (RAM), a magnetic disk, or an optical disc.

An eleventh aspect of embodiments of this application provides a computer program product including instructions. When the computer program product is run on a computer, the computer is enabled to perform the methods according to the first aspect (or any implementation of the first aspect) to the third aspect (or any implementation of the third aspect) of this application.

It can be learned from the foregoing technical solutions that embodiments of this application have at least the following advantages. A device (for example, a master device) marks a periodic code block (there may be one or more periodic code blocks, where the periodic code block may be data of one bit, or may be data of a plurality of bits) based on a preset period in a data stream to be sent from a MAC layer to a PHY layer, and the periodic code block is a set of code blocks with a fixed UI. Then, the PHY layer of the device sends the foregoing data bitstream to a peer device (for example, a slave device), records a sending time of each periodic code block as a first timestamp during sending, further sends the recorded first timestamp to the MAC layer (for example, sends the first timestamp as an independent data bitstream), and then calculates, at the MAC layer based on the returned first timestamp, a sending timestamp of a synchronization message (for example, a Sync message or a Follow_up message) to be sent to the peer device. The synchronization message carrying the sending timestamp is sent to the peer device. In embodiments, by marking a timestamp for the periodic code block received from the MAC layer, the PHY layer of the device sets a PHY-layer-based time reference scale (namely, the first timestamp). In this case, if a synchronization message needs to be sent from the MAC layer of the device to the peer device, because the time reference scale is a timestamp marked at the PHY layer, the device calculates, in real time by using the time reference scale, a time point at which the synchronization message is actually sent from the PHY layer (that is, the timestamp is marked), so that the time point at which the synchronization message is actually sent from the PHY layer of the device can be obtained, a delay at the PHY layer is eliminated, and precision of a sending timestamp of the synchronization message (for example, a 1588 message) is improved.

BRIEF DESCRIPTION OF DRAWINGS

FIG. 6 is another schematic diagram of a synchronization method according to an embodiment of this application;

FIG. 7 is another schematic diagram of a synchronization method according to an embodiment of this application;

DESCRIPTION OF EMBODIMENTS

Embodiments of the application provide a synchronization method, to eliminate a delay generated at a physical layer (PHY) layer due to a reason, such as a jitter, and to improve precision of a sending timestamp carried in a synchronization message.

For ease of understanding, before embodiments of this application are described, a principle of a synchronization mechanism involved in embodiments of the application is first described.

Figure 1:
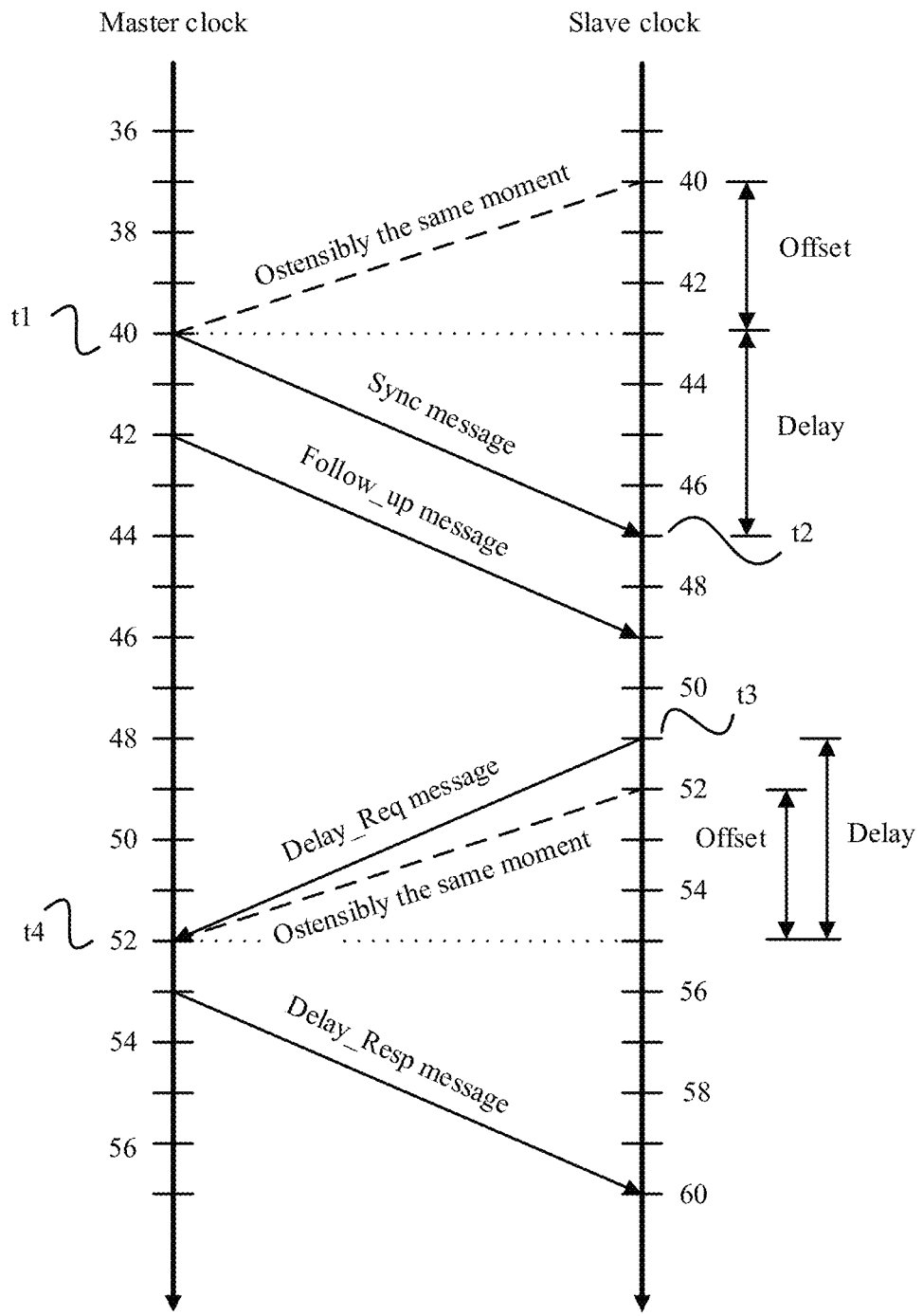
FIG. 1 is a schematic diagram of a principle of a 1588 delay response mechanism.

Currently, many systems are established in a distributed network environment. If there is no uniform and accurate time standard, it is difficult for the system to normally coordinate the running of each subsystem. Therefore, using a uniform time standard is a basic requirement of a distributed system. Based on this, the Institute of Electrical and Electronic Engineers (IEEE) 1588 protocol emerged, and a time synchronization principle in the IEEE 1588 protocol is referred to as a 1588 delay response mechanism. As shown in FIG. 1, during clock synchronization, a default master clock of a master device in a system sends a time synchronization message (which may also be referred to as a Sync message) in a multicast manner. All slave devices that are mounted in a network segment of the default master clock and that are in a same domain as the master clock each can receive the Sync message, and record, at a medium access control (MAC) layer of the slave device, a receiving time at which the Sync message is received. The Sync message carries estimated time at which the Sync message is sent by the master clock, and is not actual time (which may also be referred to as actual sending time) at which the Sync message is sent. Therefore, the master device sends a follow-up message (which may also be referred to as a Follow up message) as soon as possible after sending the Sync message. A timestamp carried in the Follow_up message accurately records the actual time at which the Sync message is sent by the master clock. In this way, the slave device can calculate a time offset (Offset in FIG. 1) between the master clock and a slave clock of the slave device based on the actual time in the Follow_up message and the receiving time of the Sync message. However, because a transmission delay (Delay in FIG. 1) between the master clock and the slave clock is unknown at an initial stage, the time offset calculated by the slave device includes a transmission delay of a network.

It can be learned from FIG. 1, that when the master clock is at 40s, a time point corresponding to the slave clock is 43s. Therefore, it can be learned that the time offset between the master clock and the slave clock needs to be compensated for. However, the slave device performs time synchronization calculation by using a time of a local clock as a reference. Therefore, from a perspective of the slave clock, the actual sending time t1 carried in the Follow up message reflects that the Sync message is sent at the time point 40s of the slave clock. Therefore, the following formula (1) reflects the time offset that includes the transmission delay of the network:

$$t2-t1=\text{Delay}+\text{Offset} \quad (1)$$

t2 is the time point at which the slave device receives the Sync message. It can be learned from formula (1) that the time offset required for synchronization between the master clock and the slave clock and the transmission delay of the network have not been accurately calculated. Therefore, to accurately calculate Offset and Delay, after receiving the Sync message, the slave device randomly sends a delay request message (which may also be referred to as a Delay Request message or referred to as a Delay_Req message for short) to the master clock. Similar to the Sync message, the slave device records a sending time t3 of the Delay_Req message. After receiving the Delay_Req message, the master device records a receiving time t4, and sends a delay response message (which may also be referred to as a Delay Response message or referred to as a Delay_Resp message for short) that includes the receiving time t4 to the slave device. Because the time offset between the master clock and the slave clock still exists, when the slave device performs calculation by using the time t4 carried in the Delay_Resp message, formula (2) reflects a difference between the time offset (Offset) and the transmission delay (Delay) of the network:

$$t4-t3=\text{Delay}-\text{Offset} \quad (2)$$

t1, t2, t3, and t4 are all known. Based on the foregoing formulas (1) and (2), the time offset between the master clock and the slave clock and the transmission delay of the network can be calculated, and a local clock of the slave device is adjusted based on the time offset between the master clock and the slave clock and the transmission delay of the network, to complete one time synchronization.

All messages involved in the 1588 delay response mechanism may be referred to as a synchronization message (such as a 1588 message). In addition, both the master device and the slave device mark a timestamp for a specific flag bit of the message at a MAC layer, so that a corresponding synchronization message carries a corresponding time point (for example, t1, t2, t3, or t4). Then, each synchronization message marked with the timestamp is sent from the MAC layer of the device to a PHY layer, and is sent from the PHY layer to a peer device.

Figure 2:
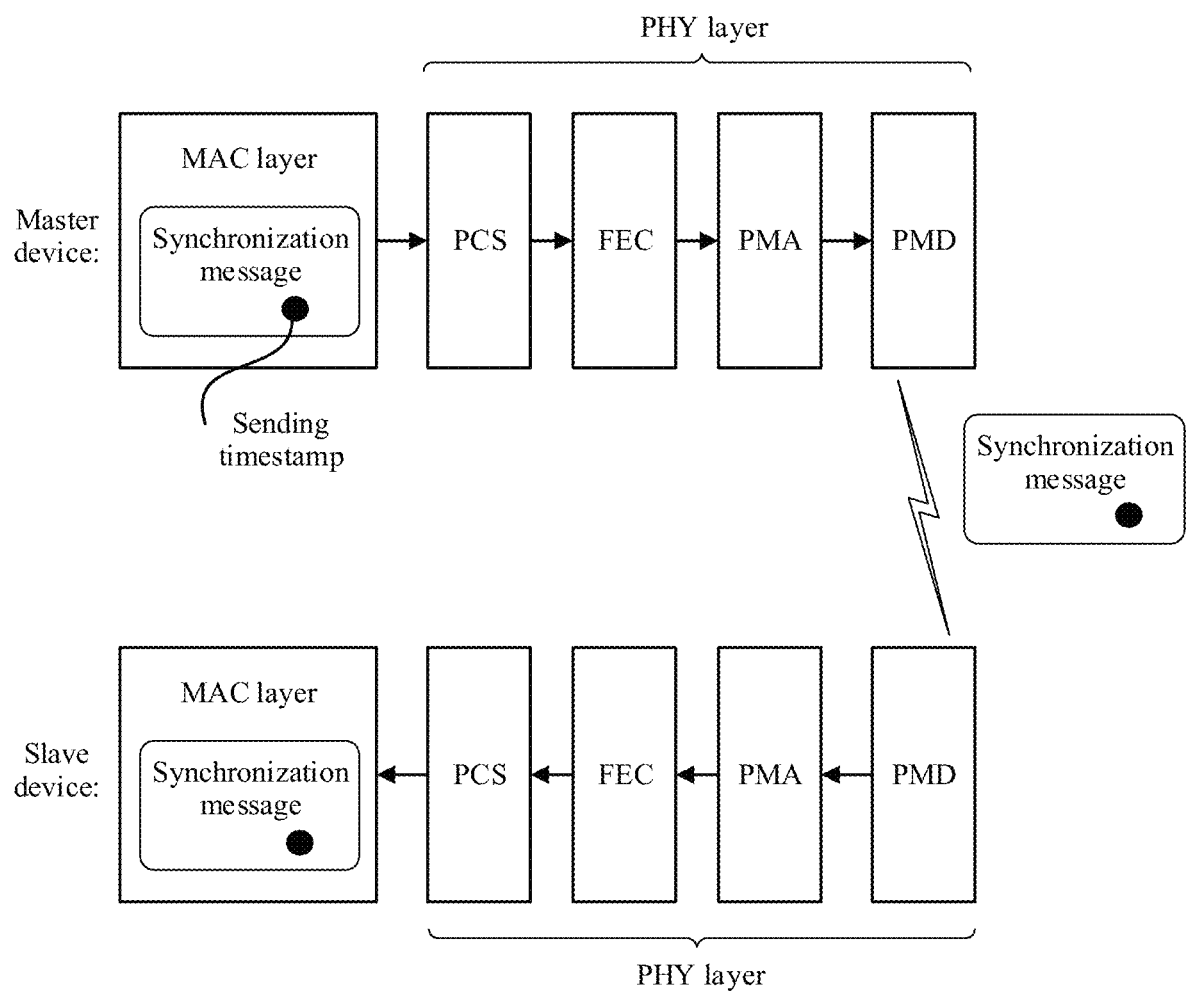
FIG. 2 is a schematic diagram of sending of a synchronization message from a master device to a slave device.

However, the timestamp is marked on the flag bit of the synchronization message at the MAC layer of the device, and the timestamp actually reflects a time point at which the synchronization message is sent from the MAC layer. However, the synchronization message further needs to cross the PHY layer and be sent to the peer device from the PHY layer. The timestamp actually needs to reflect a time point at which the synchronization message is sent from the PHY layer. PHY layers of different devices differ as network load is different. As shown in FIG. 2, the PHY layer of the master device and a PHY layer of the slave device each include a physical coding (sub) layer (PCS), a forward error correction (FEC) layer, a physical medium attachment (PMA) layer, a physical medium dependent (PMD) layer interface. Various jitters exist at the PHY layer. Due to this part of jitter, a delay is generated when the synchronization message is transmitted from the MAC layer to the PHY layer. Because PHY layers of different devices differ as network load is different, the delay changes at all moments. Consequently, precision of the sending timestamp of the synchronization message is reduced, or in other words, the sending timestamp marked at the MAC layer cannot actually reflect the time point at which the synchronization message is sent from the PHY layer.

Based on this, in a synchronization method provided in embodiments of this application, a time point at which the synchronization message is sent from the PHY layer can be accurately reflected, in other words, the sending timestamp carried in the synchronization message reflects the time point at which the synchronization message is sent from the PHY layer, so that a delay generated at the PHY layer due to a reason such as a jitter or excessively large network load is eliminated, and precision of the sending timestamp carried in the synchronization message is improved.

Figure 3:
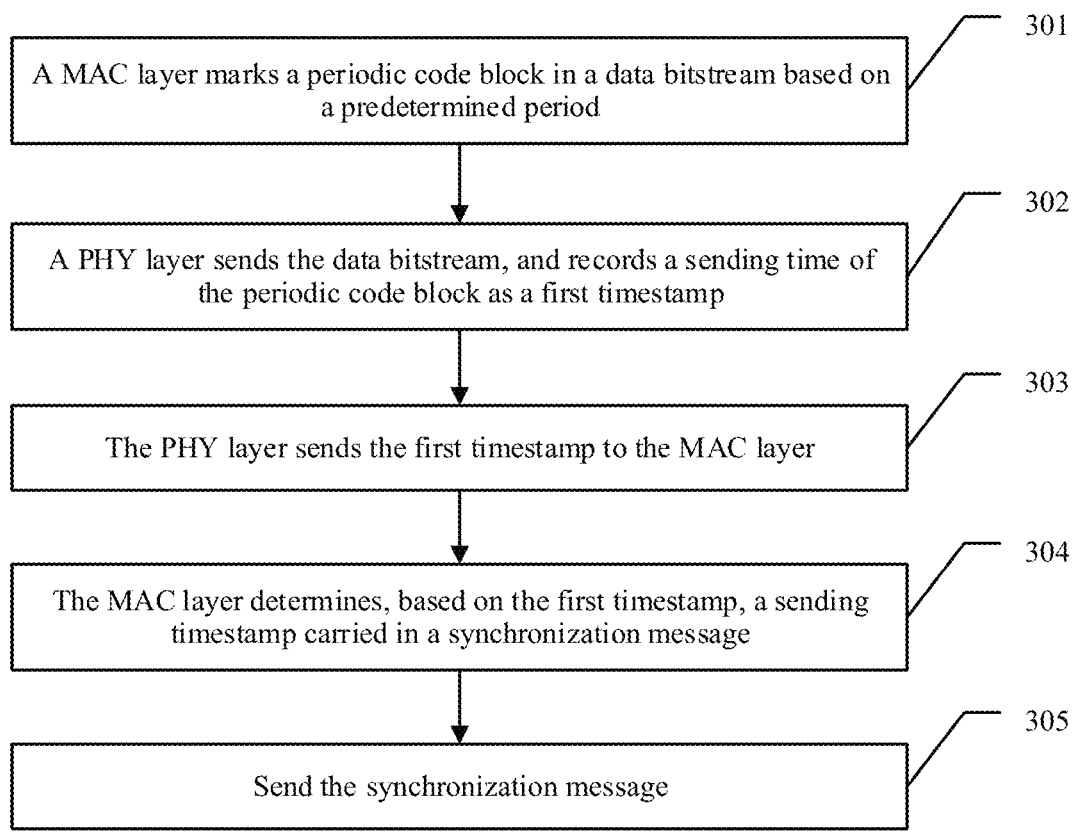
FIG. 3 is a schematic diagram of a synchronization method according to an embodiment of this application.

FIG. 3 shows a synchronization method according to an embodiment of this application, and the synchronization method may include the following steps.

301: A MAC layer marks a periodic code block in a data bitstream based on a preset period.

A MAC layer of a device marks, based on the preset period, a periodic code block in a data bitstream to be sent from the MAC layer to a PHY layer. A manner of determining the periodic code block may include determining, in the data bitstream, a special code block with an equal interval as the periodic code block, for example, an AM word in the data bitstream (because there is one AM word in the data bitstream at an interval of a same interval period, the AM word may be used as the periodic code block), or a defined periodic control block. Another manner of determining the periodic code block may include setting special marks at code block locations with equal intervals in the data bitstream, for example, marking a first code block, a tenth code block, a twentieth code block, ... in the data bitstream (that is, an interval period is nine code blocks). The manner of determining the periodic code block is not specifically limited herein. It should be further noted that the periodic code block may be data of one bit, or may be data of a plurality of bits. This is not specifically limited herein.

After marking the periodic code block for the data bitstream, the MAC layer transfers the data bitstream to the PHY layer.

302: The PHY layer sends the data bitstream, and records a sending time of the periodic code block as a first timestamp.

Then, the PHY layer obtains the data bitstream sent from the MAC layer, further sends the data bitstream to another device (for example, a slave device that communicates with a master device) through the PHY layer, and records, as the first timestamp, a sending time at which the PHY layer sends each periodic code block marked in the data bitstream. The first timestamp is a set of sending times of all periodic code blocks that are recorded in the data bitstream.

303: The PHY layer sends the first timestamp to the MAC layer.

After the PHY layer records the sending time (namely, the first timestamp) of the periodic code block in the data bitstream, the PHY layer sends the first timestamp to the MAC layer.

It should be noted that the PHY layer may send the first timestamp to the MAC layer in a plurality of manners, including but not limited to the following manners: (1) returning the first timestamp to the MAC layer as an independent data bitstream, or to be specific, each time the PHY layer records a sending time of a periodic code block, the PHY layer transmits the sending time to the MAC layer as a data bitstream; and (2) adding the first timestamp to the data bitstream to be transmitted from the PHY layer to the MAC layer, and sending the data bitstream, or to be specific, each time the PHY layer records a sending time of a periodic code block (because a data bitstream between the PHY layer and the MAC layer exists at all moments), the PHY layer adds the recorded sending time of the periodic code block to the data bitstream to be sent from the PHY layer to the MAC layer and sends the data bitstream to the MAC layer.

304: The MAC layer determines, based on the first timestamp, a sending timestamp carried in a synchronization message.

The MAC layer obtains the first timestamp sent by the PHY layer. In this case, if the MAC layer has a synchronization message (for example, a Sync message) that needs to be sent to a peer device (for example, a slave device that needs to perform clock synchronization), the MAC layer determines, based on the first timestamp, a sending timestamp carried in the synchronization message. The sending timestamp is used to indicate a time point at which the PHY layer sends the synchronization message.

It should be noted that in some embodiments, that the MAC layer determines, based on the first timestamp, a sending timestamp carried in a synchronization message may be implemented in the following manner.

When the device needs to send the synchronization message to the peer device, the MAC layer first calculates a unit interval (UI) between a flag bit of the synchronization message and a target code block, where the target code block is a periodic code block obtained by the MAC layer and that is closest to the flag bit of the synchronization message, and the target code block is located before the flag bit of the synchronization message. It should be explained herein that, it is specified in the 1588 protocol that the flag bit of the synchronization message refers to a position for marking the sending timestamp, each synchronization message has a specific flag bit for marking the sending timestamp, and the position for marking the sending timestamp may be referred to as a flag bit.

After determining the UI between the synchronization message and the target code block, the MAC layer may determine, based on the UI, a delay T caused to the PHY layer due to a reason such as a jitter. A manner of determining the delay T may be but is not limited to determining a physical link rate LinkRate (unit: bits per seconds (bps)) of the PHY layer, for example, a rate of a lane of a serializer/deserializer (serdes). The manner further includes determining that a ratio of the UI to the physical link rate LinkRate is the delay T. In other words, T=Delta/LinkRate, where Delta represents a UI distance by which the flag bit of the synchronization message is transferred at the PHY layer, Delta is related to physical coding sublayer (PCS) and forward error correction (FEC) coding overheads, and the like of the PHY layer, and if the periodic code block is an AM word, Delta is further related to AM word overheads.

After the delay T is determined, the MAC layer further calculates a sending timestamp T' of the synchronization message based on the delay T and a timestamp (which may be referred to as a second timestamp and may be denoted as Tan) that is corresponding to the target code block, where T'=Tan+T. It should be noted herein that, because the first timestamp is a set of sending times at which all periodic code blocks are sent from the PHY layer, and the target code block is the code block that is closest to the flag bit of the synchronization message, the second timestamp is included in the first timestamp.

305: Send the synchronization message.

The PHY layer of the device sends the synchronization message carrying the sending timestamp, so that the peer device that needs to perform clock synchronization obtains the synchronization message.

It should be noted that the device in some embodiments may be a master device or a slave device. Any device may be referred to as a device in this application provided that the device is configured to send a synchronization message and the synchronization message carries a sending timestamp. This is not specifically limited herein.

It should be further noted that the synchronization message in some embodiments may be a 1588 message, for example, may be a Sync message, a Follow_up message, a Delay_Req message, or a Delay_Resp message specified in the 1588 protocol in FIG. 1. Tsynchronization message is not limited herein. Any packet that is sent by the device and that carries a sending timestamp may be referred to as the synchronization message in some embodiments of this application.

Figure 4:
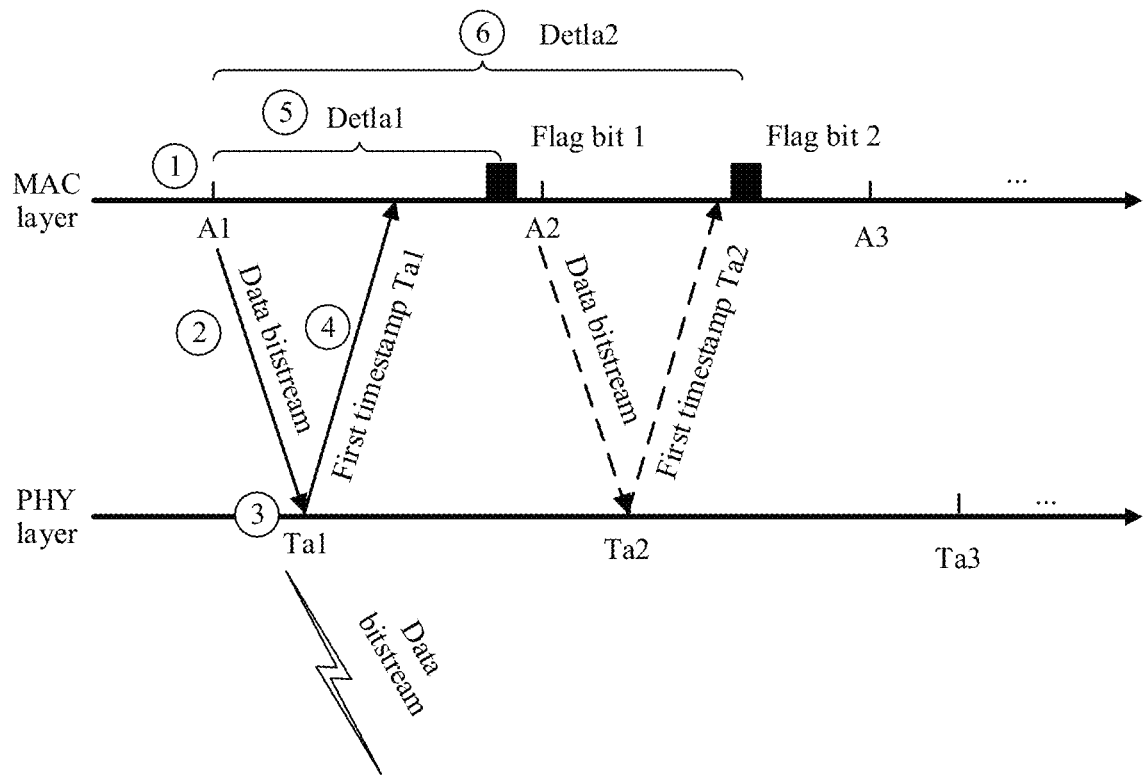
FIG. 4 is another schematic diagram of a synchronization method according to an embodiment of this application.

For ease of understanding, FIG. 4 is used as an example below to describe the synchronization method corresponding to FIG. 3.

Step 1: Periodically set a mark (A1, A2, A3, ... in FIG. 4) at an equal interval at a MAC layer, and mark, based on the foregoing mark, a periodic code block in a data bitstream to be sent to a PHY layer.

Step 2: Send the marked periodic code block to the PHY layer together with the data bitstream.

Step 3: After receiving the data bitstream, the PHY layer sends the data bitstream (for example, to a peer device). Because the periodic code block is marked in the data bitstream, when the data bitstream is sent, the PHY layer records sending time (for example, Ta1, Ta2, Ta3, ... in FIG.

4) of the periodic code block in the data bitstream, where the sending time is referred to as a first timestamp.

Step 4: The PHY layer returns the sending time (namely, the first timestamp Ta1) of the periodic code block to the MAC layer.

Step 5: When the MAC layer needs to send a synchronization message to the peer device, the MAC layer first determines a flag bit (that is, a flag bit 1 in FIG. 4) of the synchronization message and a UI distance (that is, Delta1 in FIG. 4) of a previous periodic code block, and calculates, by using the foregoing formula T=Delta/LinkRate in step 304 and T'=Tan+T, a sending timestamp carried in the synchronization message.

In some implementations, if the MAC layer needs to send the synchronization message before the sending time of the previous periodic code block (for example, A2) is received, the flag bit of the synchronization message is a flag bit 2 shown in FIG. 4, and in this case, step 5 may be replaced with step 6, or to be specific, a sending time of a periodic code block (for example, A1) before the previous periodic code block is used to calculate a UI distance (for example, Delta2 in FIG. 4) between the flag bit 2 of the synchronization message and the periodic code block before the previous periodic code block.

It should be noted that in some embodiments, the MAC layer obtains the first timestamp of the periodic code block, and may store sending times of all periodic code blocks (in this case, the sending times of all the periodic code blocks need to be marked for differentiation), or the MAC layer may store only a latest obtained sending time of the periodic code block as the first timestamp (in other words, each time a sending time of a new periodic code block is received, a previously obtained sending time of the periodic code block is deleted), or the MAC layer may store latest obtained sending times of two periodic code blocks as the first timestamp (in this case, the sending times of the two periodic code blocks need to be marked for differentiation). This is not specifically limited herein.

In the foregoing implementations, a device (for example, a master device) marks a periodic code block (there may be one or more periodic code blocks, where the periodic code block may be data of one bit, or may be data of a plurality of bits) based on a preset period in a data stream to be sent from a MAC layer to a PHY layer, and the periodic code block is a set of code blocks with a fixed UI. Then, the PHY layer of the device sends the foregoing data bitstream to a peer device (for example, a slave device), records a sending time of each periodic code block as a first timestamp during sending, further sends the recorded first timestamp to the MAC layer (for example, sends the first timestamp as an independent data bitstream), and then calculates, at the MAC layer based on the returned first timestamp, a sending timestamp of a synchronization message (for example, a Sync message or a Follow_up message) to be sent to the peer device. The synchronization message carrying the sending timestamp is sent to the peer device. In some embodiments, by marking a timestamp for the periodic code block received from the MAC layer, the PHY layer of the device sets a PHY-layer-based time reference scale (namely, the first timestamp). In this case, if a synchronization message needs to be sent from the MAC layer of the device to the peer device, because the time reference scale is a timestamp marked at the PHY layer, the device calculates, in real time by using the time reference scale, a time point at which the synchronization message is actually sent from the PHY layer (that is, the timestamp is marked), so that the time point at which the synchronization message is actually sent from the PHY layer of the device can be obtained, a delay at the PHY layer is eliminated, and precision of a sending timestamp of the synchronization message (for example, a 1588 message) is improved.

Figure 5:
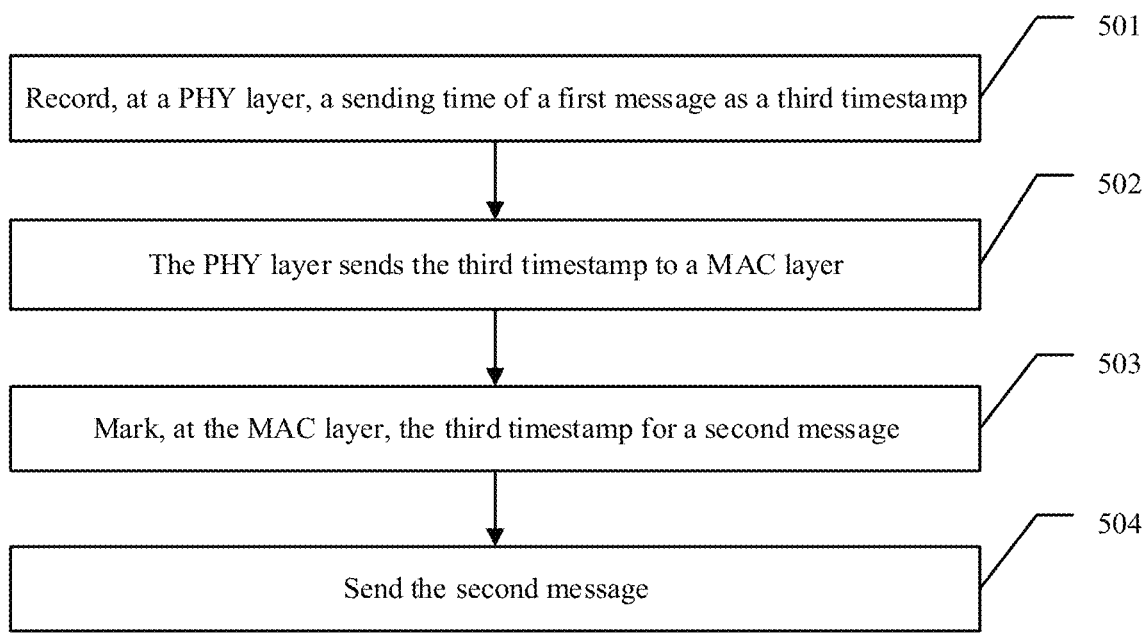
FIG. 5 is another schematic diagram of a synchronization method according to an embodiment of this application.

In the foregoing embodiments, a form of the synchronization message is not limited, provided that the synchronization message carries a sending timestamp. Therefore, in the following embodiments, another synchronization method is further provided. FIG. 5 shows another synchronization method according to an embodiment of this application, and the synchronization method includes the following steps.

501: Record, at a PHY layer, a sending time of a first message as a third timestamp.

A MAC layer of a device sends, to a PHY layer, a first message that needs to be sent to a peer device, and the PHY layer of the device sends the first message to the peer device. In this case, the PHY layer records, as the third timestamp, a sending time at which the first message is sent from the PHY layer.

502: The PHY layer sends the third timestamp to the MAC layer.

Then, the PHY layer sends the recorded third timestamp to the MAC layer.

It should be noted that the PHY layer may send the third timestamp to the MAC layer in a plurality of manners, including but not limited to the following manners:

(1) The third timestamp is returned to the MAC layer as an independent data bitstream.
(2) The third timestamp is added to a data bitstream to be transmitted from the PHY layer to the MAC layer, and sending the data bitstream, to be specific, after the PHY layer records the third timestamp, because a data bitstream between the PHY layer and the MAC layer exists at all moments, the PHY layer adds the third timestamp to the data bitstream to be sent from the PHY layer to the MAC layer, and sends the data bitstream to the MAC layer.

503: Mark, at the MAC layer, the third timestamp for a second message.

The device sends the second message immediately after sending the first message. When sending the second message, the MAC layer marks the third timestamp for the second message as a sending timestamp. The third timestamp is used to indicate exact time at which the first message is sent from the PHY layer.

504: Send the second message.

After the MAC layer sends the second message marked with the third timestamp to the PHY layer, the PHY layer sends the second message carrying the third timestamp to the peer device.

It should be noted that, in some embodiments, the sending timestamp carried in the second message is the exact time at which the first message is sent from the PHY layer of the device. For example, the first message may be a Sync message specified in a 1588 protocol, and the second message may be a Follow up message specified in the 1588 protocol.

For ease of understanding, FIG. 6 is used as an example below to describe the synchronization method corresponding to FIG. 5.

Step 1: A MAC layer first determines a first message to be sent to a peer device, and determines a flag bit 3 that is of the first message and in which a timestamp is carried.

Step 2: The MAC layer sends the first message to a PHY layer.

Step 3: After obtaining the first message, the PHY layer sends the first message to the peer device, and records sending time (for example, T1 in FIG. 6) at which the first message is sent from the PHY layer.

Step 4: The PHY layer returns the recorded sending time to the MAC layer as a third timestamp T1.

Step 5: After obtaining the third timestamp T1 sent by the PHY layer, the MAC layer stores the third timestamp T1.

Step 6: The MAC layer then sends a second message to the PHY layer, and marks the stored third timestamp T1 in a flag bit 4 of the second message, and after obtaining the second message carrying the third timestamp T1, the PHY layer sends the second message to the peer device.

In the foregoing embodiments, the sending time of the first message is marked as the third timestamp at the PHY layer, and the third timestamp (that is, a sending timestamp) is carried in the subsequently sent second message. In this way, the second message carries the exact time at which the first message is sent from the PHY layer of the device, so that a delay at the PHY layer is eliminated, and further precision of a sending timestamp of a synchronization message (for example, a 1588 message) is improved.

In the foregoing embodiments, the synchronization method is described from a perspective of sending a synchronization message by a device. The synchronization method is described below from a perspective of receiving a synchronization message by a device. FIG. 7 shows another synchronization method according to some embodiments, and the synchronization method includes the following steps.

701: A PHY layer marks, based on a preset period, a periodic code block in a data bitstream to be sent from the PHY layer to a MAC layer, and records, as a fourth timestamp, a sending time at which the periodic code block is sent from the PHY layer.

A PHY layer of a device marks, based on the preset period, a periodic code block in a data bitstream to be sent from the PHY layer to a MAC layer, and records, as the fourth timestamp, a sending time at which the periodic code block is sent from the PHY layer, where the fourth timestamp is a set of sending times of all periodic code blocks that are recorded in the data bitstream.

It should be noted that, a manner of determining the periodic code block may be to determine, in the data bitstream, a special code block with an equal interval as the periodic code block, for example, an AM word in the data bitstream (because there is one AM word in the data bitstream at an interval of a same interval period, the AM word may be used as the periodic code block), or a defined periodic control block. The manner also may be to set special marks at code block locations with equal intervals in the data bitstream, for example, marking a first code block, a tenth code block, a twentieth code block, . . . in the data bitstream (that is, an interval period is nine code blocks). The manner of determining the periodic code block is not specifically limited herein. It should be further noted that the periodic code block may be data of one bit, or may be data of a plurality of bits. This is not specifically limited herein.

702: The PHY layer sends the fourth timestamp to the MAC layer.

After recording the sending time (namely, the fourth timestamp) of the periodic code block in the data bitstream, the PHY layer sends the fourth timestamp to the MAC layer.

It should be noted that the PHY layer may send the fourth timestamp to the MAC layer in a plurality of manners, including but not limited to the following manners:

(1) The fourth timestamp is returned to the MAC layer as an independent data bitstream, to be specific, each time the PHY layer records a sending time of a periodic code block, the PHY layer transmits the sending time to the MAC layer as a data bitstream.

(2) The fourth timestamp is added to a data bitstream to be transmitted from the PHY layer to the MAC layer (for example, the foregoing data bitstream), and the data bitstream is sent, to be specific, each time the PHY layer records a sending time of a periodic code block (because a data bitstream between the PHY layer and the MAC layer exists at all moments), the PHY layer adds the recorded sending time of the periodic code block to the data bitstream to be sent from the PHY layer to the MAC layer, and sends the data bitstream to the MAC layer.

703: The MAC layer determines, based on the fourth timestamp, a receiving time at which the PHY layer obtains a synchronization message.

The MAC layer obtains the fourth timestamp sent by the PHY layer. If the PHY layer obtains a synchronization message (such as a Sync message) sent by a peer device in this case, the MAC layer determines, based on the fourth timestamp, a receiving time at which the synchronization message is obtained at the PHY layer, and the receiving time is used to indicate a time point at which the synchronization message is received by the PHY layer.

It should be noted that in some embodiments, that the MAC layer determines, based on the fourth timestamp, a receiving time at which the synchronization message is obtained at the PHY layer may be implemented in the following manner.

When obtaining the synchronization message sent by the peer device, the PHY layer of the device sends the synchronization message to the MAC layer. The MAC layer first calculates a UI distance between a flag bit of the synchronization message and a target code block, where the target code block is a periodic code block obtained by the MAC layer and that is closest to the flag bit of the synchronization message, and the target code block is located before the flag bit of the synchronization message.

After determining the UI between the synchronization message and the target code block, the MAC layer may determine, based on the UI, a delay T caused to the PHY layer due to a reason such as a jitter. A manner of determining the delay T may be but is not limited to, determining a physical link rate LinkRate (unit: bps) of the PHY layer, for example, a rate of a lane of a serdes; and then, further determining that a ratio of the UI to the physical link rate LinkRate is the delay T. In other words, T=Delta/LinkRate, where Delta represents a UI distance by which the flag bit of the synchronization message is transferred at the PHY layer, Delta is related to PCS and FEC coding overheads, and the like of the PHY layer, and if the periodic code block is an AM word, Delta is further related to AM word overheads.

After the delay T is determined, the MAC layer further calculates a sending timestamp T' of the synchronization message based on the delay T and a timestamp (which may be referred to as a fifth timestamp and may be denoted as Tbn) that is corresponding to the target code block, where T'=Tbn+T. It should be noted herein that, because the fourth timestamp is a set of sending times at which all periodic code blocks are sent from the PHY layer, and the target code block is the code block that is closest to the flag bit of the synchronization message, the fifth timestamp is included in the fourth timestamp.

It should be further noted that the synchronization message in some embodiments may be a 1588 message, for example, may be a Sync message, a Follow_up message, a Delay_Req message, or a Delay_Resp message that is specified in a 1588 protocol in FIG. 1. The synchronization message is not specifically limited herein. Any synchronization message that is sent by the peer device and for which the device needs to determine a receiving time at which the PHY layer obtains the synchronization message is the synchronization message in some embodiments. This is not specifically limited herein.

Figure 8:
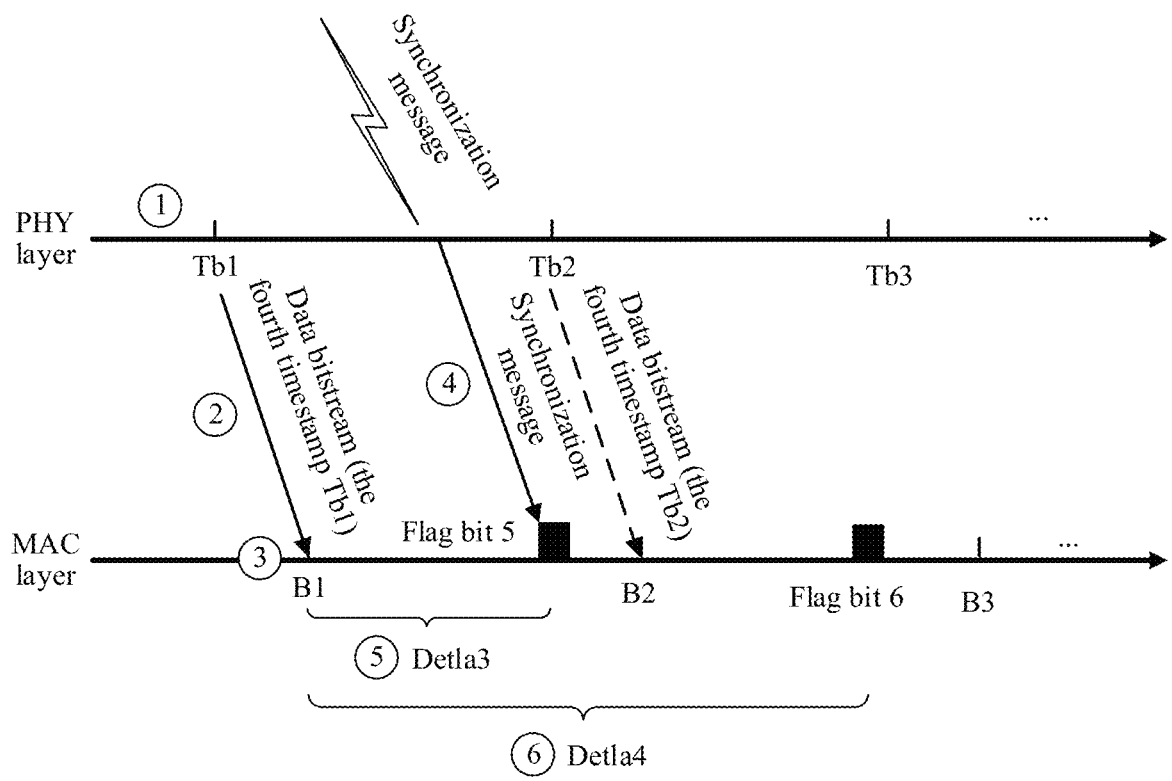
FIG. 8 is another schematic diagram of a synchronization method according to an embodiment of this application.

For ease of understanding, FIG. 8 is used as an example below to describe the synchronization method corresponding to FIG. 7.

Step 1: Periodically set a mark (for example, B1, B2, B3, . . . in FIG. 8) at an equal interval at a PHY layer, and mark, based on the foregoing mark, a periodic code block in a data bitstream to be sent to a MAC layer.

Step 2: Send the marked periodic code block to the MAC layer together with the data bitstream. The PHY layer may record, as a fourth timestamp (for example, Tb1, Tb2, Tb3, . . . in FIG. 8), a sending time at which each periodic code block is sent from the PHY layer to the MAC layer, and send the fourth timestamp to the MAC layer together with the data bitstream.

Step 3: After receiving the data bitstream, the MAC layer records sending time (for example, Tb1, Tb2, Tb3, . . . in FIG. 8) of the periodic code block in the data bitstream, where the sending time is referred to as the fourth timestamp.

Step 4: When the PHY layer of the device obtains a synchronization message sent by a peer device, the PHY layer further sends the synchronization message to the MAC layer.

Step 5: When obtaining the synchronization message, the MAC layer determines a UI distance (that is, Delta3 in FIG. 8) between a flag bit (that is, a flag bit 5 in FIG. 8) of the synchronization message and a previous periodic code block, and calculates, by using the foregoing formula T=Delta/LinkRate in step 702 and T'=Tbn+T, a receiving time at which the PHY layer obtains the synchronization message.

In some implementations, if the MAC layer obtains, before a sending time of the previous periodic code block (for example, B2) is received, the synchronization message sent from the PHY layer, the flag bit of the synchronization message is a flag bit 6 shown in FIG. 8, and in this case, step 5 may be replaced with step 6, or to be specific, a sending time of a periodic code block (for example, B1) before the previous periodic code block is used to calculate a UI distance (for example, Delta4 in FIG. 8) between the flag bit 6 of the synchronization message and the periodic code block before the previous periodic code block.

It should be noted that in some embodiments, the MAC layer obtains the fourth timestamp of the periodic code block, and may store sending times of all periodic code blocks (in this case, the sending times of all the periodic code blocks needs to be marked for differentiation), or the MAC layer may store only a latest obtained sending time of the periodic code block as the fourth timestamp (in other words, each time s sending time of a new periodic code block is received, a previously obtained sending time of the periodic code block is deleted), or the MAC layer may store latest obtained sending times of two periodic code blocks as the fourth timestamp (in this case, the sending times of the two periodic code blocks need to be marked for differentiation). This is not specifically limited herein.

In the foregoing implementations, the device (for example, a slave device) marks, based on a preset period, a periodic code block (there may be one or more periodic code blocks, where the periodic code block may be data of one bit, or may be data of a plurality of bits) in a data stream to be sent from the PHY layer to the MAC layer, records, as the fourth timestamp, a sending time at which the PHY layer sends the periodic code block, and further sends the recorded fourth timestamp to the MAC layer (for example, sending the fourth timestamp as an independent data bitstream). When the MAC layer receives the synchronization message sent by the PHY layer (the synchronization message is sent by a peer device to the PHY layer), the MAC layer calculates, based on the fourth timestamp, a receiving time at which the PHY layer obtains the synchronization message (for example, a Sync message or a Follow up message). In some embodiments, by marking a timestamp for the periodic code block to be sent to the MAC layer, the PHY layer of the device sets a PHY-layer-based time reference scale (namely, the fourth timestamp). In this case, if the PHY layer obtains the synchronization message sent by the peer device, the synchronization message needs to be sent from the PHY layer to the MAC layer for identification. Because the time reference scale is a timestamp marked at the PHY layer, the MAC layer calculates, in real time by using the time reference scale, a time point (that is, a receiving time) at which the synchronization message is actually obtained from the PHY layer, so that the time point at which the synchronization message is actually sent from the PHY layer of the device can be obtained, a delay at the PHY layer is eliminated, and precision of the receiving time of the synchronization message (for example, a 1588 message) is improved.

In some embodiments, a related device for implementing the foregoing synchronization method may be divided into function modules based on examples in the foregoing synchronization method. For example, each function module corresponding to each function may be obtained through division, or two or more functions may be integrated into one processing module. The integrated module may be implemented in a form of hardware, or may be implemented in a form of a software function module. It should be noted that, in some embodiments, division into modules is an example, and is merely logical function division. In actual implementation, another division manner may be used.

Figure 9:
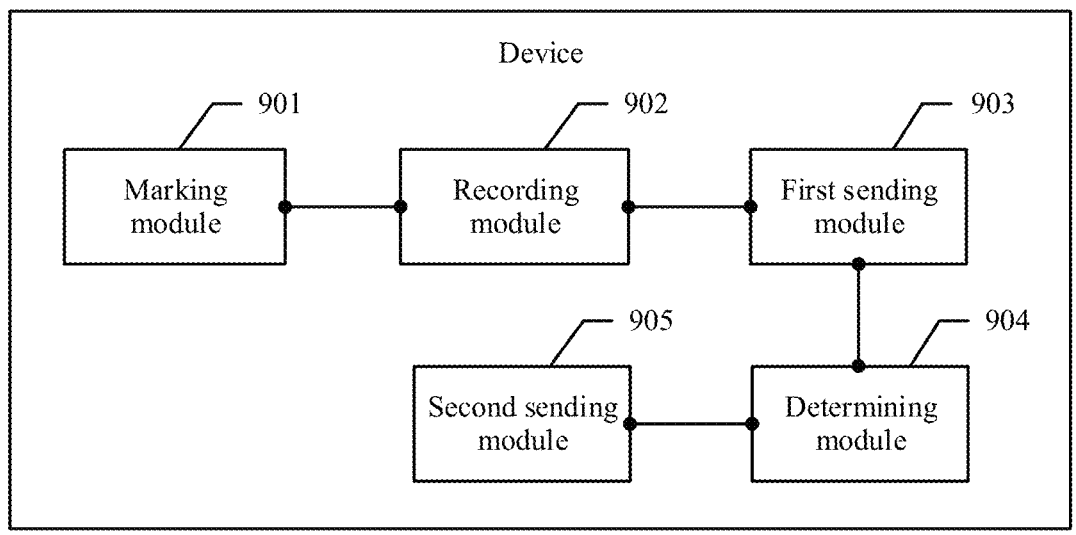
FIG. 9 is a schematic diagram of a device according to an embodiment of this application.

For example, FIG. 9 is a schematic diagram of a device. The device provided in some embodiments may include a marking module 901, a recording module 902, a first sending module 903, a determining module 904, and a second sending module 905. The marking module 901 and the determining module 904 exist at a MAC layer of the device, and the recording module 902, the first sending module 903, and the second sending module 905 exist at a PHY layer of the device.

In addition, the marking module 901 is configured to mark, based on a preset period, a periodic code block in a data bitstream to be sent from the MAC layer to the PHY layer.

The recording module 902 is configured to send the data bitstream, and record a sending time of the periodic code block as a first timestamp.

The first sending module 903 is configured to send the first timestamp to the MAC layer.

The determining module 904 is configured to determine, based on the first timestamp, a sending timestamp carried in a synchronization message.

The second sending module 905 is configured to send the synchronization message.

Preferably, in some implementations, the determining module 904 is configured to calculate a UI between a flag bit of the synchronization message and a target code block, where the target code block is a periodic code block and that is closest to the flag bit, and the target code block is located before the flag bit. The determining module 904 is further configured to determine a delay based on the UI. The determining module 904 is further configured to calculate the sending timestamp based on a second timestamp and the delay, where the second timestamp is a timestamp corresponding to the target code block, and the second timestamp is included in the first timestamp.

Preferably, in some implementations of this application, the determining module 904 is further configured to determine a physical link rate of the PHY layer, and determine that a ratio of the UI to the physical link rate is the delay.

Preferably, in some implementations of this application, the first sending module 903 is configured to send the first timestamp to the MAC layer as an independent data bitstream or add the first timestamp to a data bitstream to be transmitted from the PHY layer to the MAC layer, and send the data bitstream.

Preferably, in some implementations of this application, the synchronization message includes a 1588 message.

A specific function and a structure of the device in some embodiments corresponding to FIG. 9 are used to implement the foregoing steps of performing processing by the MAC layer and the PHY layer of the device in FIG. 3 and FIG. 4. Details are not described herein again.

Figure 10:
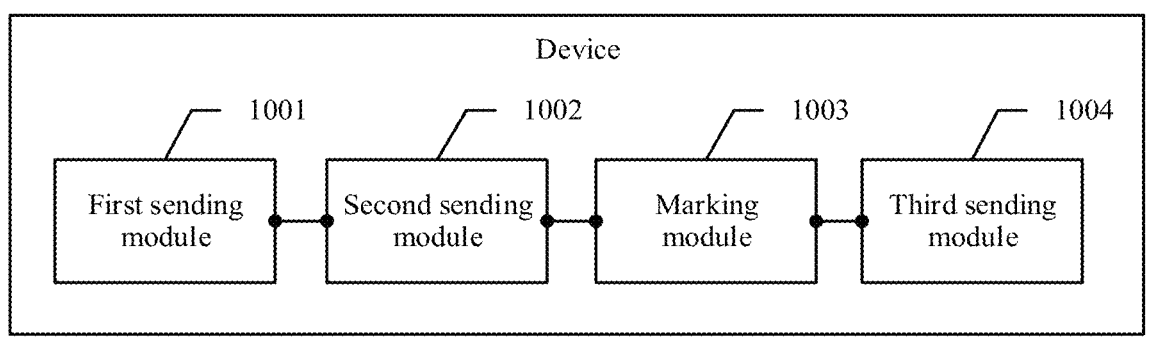
FIG. 10 is another schematic diagram of a device according to an embodiment of this application.

FIG. 10 is another schematic diagram of a device. The device provided in some embodiments may include a first sending module 1001, a second sending module 1002, a marking module 1003, and a third sending module 1004. The marking module 1003 is located at a MAC layer of the device, and the first sending module 1001, the second sending module 1002, and the third sending module 1004 are located at a PHY layer of the device.

In addition, the first sending module 1001 is configured to record a sending time of a first message as a third timestamp.

The second sending module 1002 is configured to send the third timestamp to the MAC layer.

The marking module 1003 is configured to mark the third timestamp for a second message.

The third sending module 1004 is configured to send the second message.

Preferably, in some implementations, the second sending module 1002 is configured to send the third timestamp to the MAC layer as an independent data bitstream or add the third timestamp to a data bitstream to be transmitted from the PHY layer to the MAC layer, and send the data bitstream.

Preferably, in some implementations, the first message is a Sync message specified in a 1588 protocol, and the second message is a Follow_up message specified in the 1588 protocol.

A specific function and a structure of the device in the embodiments corresponding to FIG. 10 are used to implement the foregoing steps of performing processing by the MAC layer and the PHY layer of the device in FIG. 5 and FIG. 6. Details are not described herein again.

Figure 11:
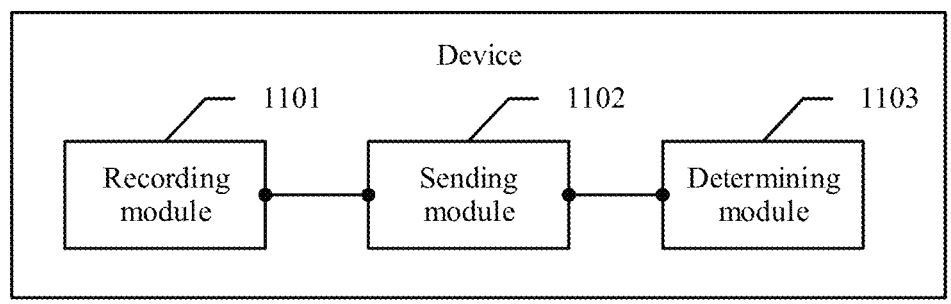
FIG. 11 is another schematic diagram of a device according to an embodiment of this application.

FIG. 11 is another schematic diagram of a device. The device provided in some embodiments may include a recording module 1101, a sending module 1102, and a determining module 1103. The determining module 1103 is located at a MAC layer of the device, and the recording module 1101 and the sending module 1102 are located at a PHY layer of the device.

In addition, the recording module 1101 is configured to mark, based on a preset period, a periodic code block in a data bitstream to be sent from the PHY layer to the MAC layer, and record, as a fourth timestamp, a sending time at which the periodic code block is sent from the PHY layer.

The sending module 1102 is configured to send the fourth timestamp to the MAC layer.

The determining module 1103 is configured to determine, based on the fourth timestamp, a receiving time at which the PHY layer obtains the synchronization message.

Preferably, in some implementations, the determining module 1103 is configured to calculate a unit interval UI between a flag bit of the synchronization message and a target code block, where the target code block is a periodic code block and that is closest to the flag bit, and the target code block is located before the flag bit. The determining module 1103 may be further configured to determine a delay based on the UI. The determining module 1103 may be further configured to calculate the receiving timestamp based on a fifth timestamp and the delay, where the fifth timestamp is a timestamp corresponding to the target code block, and the fifth timestamp is included in the fourth timestamp.

Preferably, in some implementations, the determining module 1103 is further configured to determine a physical link rate of the PHY layer, and determine that a ratio of the UI to the physical link rate is the delay.

Preferably, in some implementations, the sending module 1102 is further configured to send the fourth timestamp to the MAC layer as an independent data bitstream or add the fourth timestamp to a data bitstream to be transmitted from the PHY layer to the MAC layer, and send the data bitstream.

Preferably, in some implementations, the synchronization message includes a 1588 message.

A specific function and a structure of the device in the embodiments corresponding to FIG. 11 are used to implement the foregoing steps of performing processing by the MAC layer and the PHY layer of the device in FIG. 7 and FIG. 8. Details are not described herein again.

Figure 12:
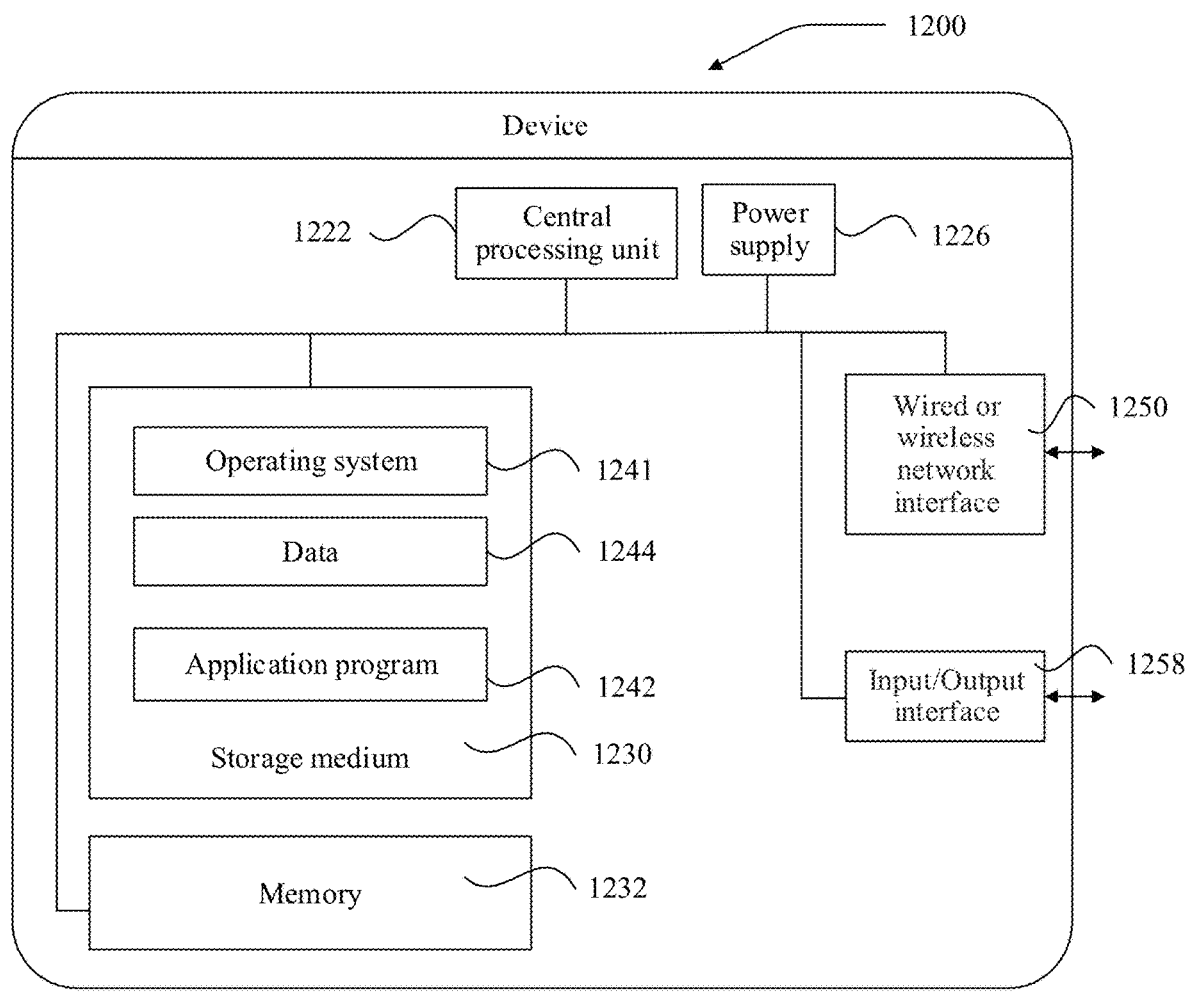
FIG. 12 is a schematic diagram of an entity apparatus of a device according to an embodiment of this application.

This application further provides a device 1200. FIG. 12 is another schematic diagram of the device 1200 according to some embodiments. For ease of description, only a part related to embodiments of this application is shown. For specific technical details that are not disclosed, refer to the method part of embodiments of this application. The device 1200 may be configured to perform steps performed by the MAC layer or the PHY layer of the device in any one of the foregoing embodiments shown in FIG. 3 to FIG. 8. For details, refer to related descriptions in the foregoing method embodiments. The device 1200 may vary greatly due to different configurations or performance, and may include one or more central processing units (CPUs) 1222 (for example, one or more processors), a memory 1232, and one or more storage media 1230 (for example, one or more mass storage devices) that store an application program 1242 or data 1244. The memory 1232 and the storage medium 1230 each may be a transitory storage or a persistent storage. A program stored in the storage medium 1230 may include one or more modules (not shown in the figure), and each module may include a series of instruction operations for a server. Further, the central processing unit 1222 may be configured to communicate with the storage medium 1230, and perform, on the device 1200, the series of instruction operations in the storage medium 1230.

The device 1200 may further include one or more power supplies 1226, one or more wired or wireless network interfaces 1250, one or more input/output interfaces 1258, and/or one or more operating systems 1241, for example, Windows Server™, Mac OS X™, Unix™, Linux™, and FreeBSD™.

Steps performed by the MAC layer or the PHY layer in the foregoing embodiments corresponding to FIG. 3 to FIG. 8 may be implemented based on the structure shown in FIG. 12.

All or a part of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A synchronization method, comprising:
    marking, based on a preset period, a periodic code block in a data bitstream to be sent from a medium access control (MAC) layer to a physical (PHY) layer;
    sending, by the PHY layer, the data bitstream, and recording a sending time of the periodic code block as a first timestamp;
    sending, by the PHY layer, the first timestamp to the MAC layer;
    determining, based on the first timestamp, a sending timestamp carried in a synchronization message; and
    sending the synchronization message.

2. The method according to claim 1, wherein the determining, based on the first timestamp, the sending timestamp carried in the synchronization message comprises:
    calculating a unit interval (UI) between a flag bit of the synchronization message and a target code block, wherein the target code block is a periodic code block that is closest to the flag bit in the data bitstream, and the target code block is located before the flag bit;
    determining a delay based on the UI; and
    calculating the sending timestamp based on a second timestamp and the delay, wherein the second timestamp is a timestamp corresponding to the target code block, and the second timestamp is comprised in the first timestamp.

3. The method according to claim 2, wherein the determining the delay based on the UI comprises:
    determining a physical link rate of the PHY layer; and
    determining a ratio of the UI to the physical link rate as the delay.

4. The method according to claim 1, wherein the sending, by the PHY layer, the first timestamp to the MAC layer comprises:
    sending the first timestamp to the MAC layer as an independent data bitstream; or
    adding the first timestamp to the data bitstream to be transmitted from the PHY layer to the MAC layer, and sending the data bitstream.

5. The method according to claim 1, wherein the synchronization message comprises:
    a message in a 1588 protocol format.

6. A synchronization method, comprising:
    marking, based on a preset period, a periodic code block in a data bitstream to be sent from a physical (PHY) layer to a medium access control (MAC) layer, and recording, as a first timestamp, a sending time at which the periodic code block is sent from the PHY layer;
    sending, by the PHY layer, the first timestamp to the MAC layer; and
    determining, based on the first timestamp, a receiving time at which the PHY layer obtains a synchronization message.

7. The method according to claim 6, wherein the determining, based on the first timestamp, the receiving time at which the PHY layer obtains the synchronization message comprises:
    calculating a unit interval (UI) between a flag bit of the synchronization message and a target code block, wherein the target code block is a periodic code block and that is closest to the flag bit in the data bitstream, and the target code block is located before the flag bit;
    determining a delay based on the UI; and
    calculating the receiving time based on a second timestamp and the delay, wherein the second timestamp is a timestamp corresponding to the target code block, and the second timestamp is comprised in the first timestamp.

8. The method according to claim 7, wherein the determining the delay based on the UI comprises:
    determining a physical link rate of the PHY layer; and
    determining a ratio of the UI to the physical link rate as the delay.

9. The method according to claim 6, wherein the sending, by the PHY layer, the first timestamp to the MAC layer comprises:
    sending the first timestamp to the MAC layer as an independent data bitstream; or
    adding the first timestamp to the data bitstream to be transmitted from the PHY layer to the MAC layer, and sending the data bitstream.

10. The method according to claim 6, wherein the synchronization message comprises:
    a message in a 1588 protocol format.

11. A device, comprising a processor and a memory, wherein the processor is coupled to the memory, and is configured to read and execute instructions stored in the memory, to implement following steps:
    marking, based on a preset period, a periodic code block in a data bitstream to be sent from a medium access control (MAC) layer to a physical (PHY) layer;
    sending, by the PHY layer, the data bitstream, and recording a sending time of the periodic code block as a first timestamp;
    sending, by the PHY layer, the first timestamp to the MAC layer;
    determining, based on the first timestamp, a sending timestamp carried in a synchronization message; and
    sending the synchronization message.

12. The device according to claim 11, wherein the determining, based on the first timestamp, the sending timestamp carried in the synchronization message comprises:
calculating a unit interval (UI) between a flag bit of the synchronization message and a target code block, wherein the target code block is a periodic code block that is closest to the flag bit in the data bitstream, and the target code block is located before the flag bit;
determining a delay based on the UI; and
calculating the sending timestamp based on a second timestamp and the delay, wherein the second timestamp is a timestamp corresponding to the target code block, and the second timestamp is comprised in the first timestamp.

13. The device according to claim 12, wherein the determining the delay based on the UI comprises:
determining a physical link rate of the PHY layer; and
determining a ratio of the UI to the physical link rate as the delay.

14. The device according to claim 11, wherein the sending, by the PHY layer, the first timestamp to the MAC layer comprises:
sending the first timestamp to the MAC layer as an independent data bitstream; or
adding the first timestamp to the data bitstream to be transmitted from the PHY layer to the MAC layer, and sending the data bitstream.

15. The device according to claim 1, wherein the synchronization message comprises:
a message in a 1588 protocol format.

16. A device, comprising a processor and a memory, wherein the processor is coupled to the memory, and is configured to read and execute instructions stored in the memory, to implement following steps:
marking, based on a preset period, a periodic code block in a data bitstream to be sent from a PHY layer to a MAC layer, and recording, as a first timestamp, a sending time at which the periodic code block is sent from the PHY layer;
sending, by the PHY layer, the first timestamp to the MAC layer; and
determining, based on the first timestamp, a receiving time at which the PHY layer obtains a synchronization message.

17. The device according to claim 16, wherein the determining, based on the first timestamp, the receiving time at which the PHY layer obtains the synchronization message comprises:
calculating a unit interval (UI) between a flag bit of the synchronization message and a target code block, wherein the target code block is a periodic code block and is closest to the flag bit in the data bitstream, and the target code block is located before the flag bit;
determining a delay based on the UI; and
calculating the receiving time based on a second timestamp and the delay, wherein the second timestamp is a timestamp corresponding to the target code block, and the second timestamp is comprised in the first timestamp.

18. The device according to claim 17, wherein the determining the delay based on the UI comprises:
determining a physical link rate of the PHY layer; and
determining a ratio of the UI to the physical link rate as the delay.

19. The device according to claim 16, wherein the sending, by the PHY layer, the first timestamp to the MAC layer comprises:
sending the first timestamp to the MAC layer as an independent data bitstream; or
adding the first timestamp to the data bitstream to be transmitted from the PHY layer to the MAC layer, and sending the data bitstream.

20. The device according to claim 16, wherein synchronization message comprises:
a message in a 1588 protocol format.

* * * * *

UNITED STATES PATENT AND TRADEMARK OFFICE
CERTIFICATE OF CORRECTION

| | | |
|---|---|---|
| PATENT NO. | : 12,133,185 B2 | Page 1 of 1 |
| APPLICATION NO. | : 17/725962 | |
| DATED | : October 29, 2024 | |
| INVENTOR(S) | : Yongzhi Liu et al. | |

It is certified that error appears in the above-identified patent and that said Letters Patent is hereby corrected as shown below:

In the Claims

In Column 22, Claim 7, Line 29, delete "that is" and insert -- is --, therefor.

In Column 23, Claim 15, Line 29, delete "claim 1," and insert -- claim 11, --, therefor.

Signed and Sealed this
Twenty-first Day of January, 2025

Coke Morgan Stewart
*Acting Director of the United States Patent and Trademark Office*